United States Patent Office 3,295,939
Patented Jan. 3, 1967

3,295,939
TROPOLONE CONTAINING POLYMERS
Lorraine Guy Donaruma, Media, Pa., assignor to E. I. du Pont de Nemours and Company, Wilmington, Del., a corporation of Delaware
No Drawing. Filed July 10, 1962, Ser. No. 208,900
27 Claims. (Cl. 51—298)

This invention is a continuation-in-part of my copending application Serial No. 45,307, filed July 26, 1960, and now abandoned.

This invention relates to new polymeric products containing chelate-forming functional groups and more particularly to tropolone-containing polymers.

A material possesses a structure capable of forming chelate configurations with metal ions if it contains at least two groups with the proper spacial relationship to behave as donors for bond formation. The groups must be oriented to permit the formation of a chelate ring. Chelate linkages normally result in the formation of five- or six-memberd rings, although chelate rings of other sizes are known. The donor groups may be: (1) acid groups in which the acid hydrogen is replaced by the metal ion and/or (2) neutral groups possessing a pair of electrons suitable for bond formation.

Materials capable of forming chelate structures are of considerable importance in many industrial applications. For example, chelate compounds are useful as catalysts, fuel additives and medicinals. Chelating agents are used in metal ion control, solvent extraction, ion exchange; dyeing processes and leather tanning.

It is an object of this invention to provide new and useful chelating agents. It is a further object of the invention to provide new and useful chelate compositions. It is a still further object of the invention to provide novel polymers containing chelate-forming functional groups. Another object is to provide an economical and convenient method of forming these polymeric materials.

Another object of the invention is to provide compositions of the aforementioned polymeric materials, useful as adhesives in making composite articles of the same or dissimilar materials and composite articles joined by these novel adhesives. Other and additional objectives will become apparent as the invention is further described.

The above objects are accomplished according to the present invention by providing a new class of polymers characterized by the recurring structural unit:

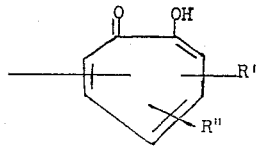

wherein the bonding sites are located at the unsubstituted positions on the tropolone ring; R' is a divalent radical selected independently from the group consisting of —CH(Y)—, —CH(Y)—O—CH—(Y)—
—CH(Y)—OCH(Y)—X—CH(Y)—OCH(Y)—
—CH(Y)—X—CH(Y)—
—CH(Y)—X—CH(Y)—O—CH(Y)—
—CH(Y)—O—CH(Y)X— and —CH(Y)X— where Y is selected from the group consisting of hydrogen, an alkyl group having from 1 to about 12 carbon atoms, an alkenyl group having from 1 to about 12 carbon atoms, a cycloalkyl group having from 3 to 7 carbon atoms, and a cyclo alkenyl group having from 3 to 7 carbon atoms, and X represents a radical of a comonomer, said comonomer containing at least two chemically reactive groups which add to aldehydes to form hydroxymethylene groups, said radical being at least divalent and formed from the comonomer by removal of a hydrogen from each of at least two of the chemically reactive groups; and R" is the same as R' or —H or —CH(Y)OH.

By comonomer is meant a simple molecule capable of undergoing copolymerization with tropolone by aldehyde condensation.

Hence, the polymers of the instant invention comprise linear and cross-linked homopolymers and copolymers. Those polymers wherein R" is —CH(Y)OH are so called "prepolymers" or linear polymers capable of cross-linking through the —CH(Y)OH group to give insoluble, infusible polymers upon heating.

The polymeric products of this invention are obtained by the condensation of tropolone and an aldehydic compound in the presence of a catalyst. The process consists essentially of reacting aqueous mixtures of tropolone and an aldehydic compound in the presence of a catalyst at slightly elevated temperatures. The mixtures may contain, optionally, condensable comonomers.

The process yields solid products which are linear and/or cross-linked polymers. The tropolone nucleus is intact in the polymer molecule, as verified by the tropolone-like infrared spectra still retained by the polymer and the ability of the polymers to form chelates. The adjacent hydroxyl and carbonyl groups on the cycloheptatriene rings provide the bonding sites which allow the formation of chelate rings. Infrared analyses also show that the tropolone units are linked through methylene or ether bridges.

Concerning the methylene and ether linkages, there is no acurate basis by which the relative proportion of each in the polymer can be approximated. The

bridges are believed to form by a reaction of the type

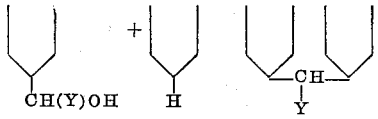

whereas the ether bridges form by

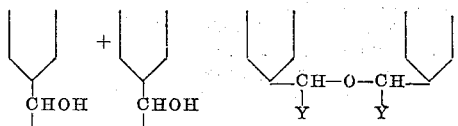

The

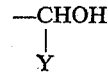

group is the addition product of the aldehyde with a reactive hydrogen on the tropolone ring. In a like manner, comonomers contain reactive hydrogen which combines with the aldehyde to form

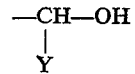

groups.

The polymers are weakly acidic and readily form metal derivatives with metal ions when contacted with their solutions. The polymeric metal derivatives are of two types: (1) the simple salts (tropolonates and "tropyllium type" salts) where chelation is not the dominant tendency and (2) chelate compositions wherein five-membered chelate rings predominate. The tropolonates, which have salt-like properties, form when the polymers are contacted with solutions of the alkali metal hydroxides. "Tropyllium-type" salts form when the tropolone nucleus becomes positively charged and reacts with anionic metal complexes, e.g., as $[Trop]^+[FeCl_4]^-$. The chelate compositions show typical chelate properties and may be complex ions or electrically neutral species, depending upon the oxidation state of the metal ion and the number of tropolone units associated therewith. Generally, when the number of tropolone units chelated with the metal ion is twice that of its oxidation state, the chelate formed is a nonelectrolyte. When the number of tropolone units is greater or less than the oxidation state, complex anions or cations are formed. Metal ions such as beryllium, calcium, cobalt, copper, magnesium, nickel, lead, thorium, zirconium, tantalum, tin, iron, cerium, and the like form chelate structures. The metallic chelate derivatives are often highly colored and are stable at low pH values. Chelates are most readily formed by metals of the transition series.

The simple polymeric salts such as those formed by reaction with alkali metal type ions, correspond generally to the formula

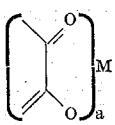

where M represents a cation and "$a$" represents the number of tropolonate units available to neutralize its charge, only the portion of the molecule containing the chelating groups being shown.

Structures of the polymeric chelates cannot be represented with complete certainty, although the best available evidence indicates that these are five-membered, heterocyclic ring structures. Ring enclosure is affected most probably through the metal ion as shown in the molecule portions below.

(a) When a divalent metal ion, $M^{++}$, combines with only one mer unit, the metal is most likely contained in a species represented by

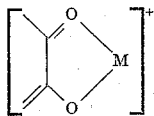

where the residual charge may be neutralized by anions from the solutions.

(b) When $M^{++}$ ion combines with two mer units, either in the same molecule or in two different molecules, the metal ion is most likely contained in an electrically neutral species represented by the structure

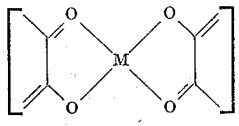

(c) For metal ions with higher ionic valances and/or coordination numbers, more complex structures are possible. However, these are not readily represented structurally. To represent these compositions, the symbol, chel, will be used in place of the structural units depicted above. Thus, for trivalent metal ions, the metal may combine with one, two or three units permitting the chelate species $[Chel M]^{++}$, $[(Chel)_2 M]^+$, and $[Chel_3 M]$ to form. The complex ions are probably neutralized electrically by anions from the solutions. It is also possible, although less likely, that trivalent metal ions whose coordination number is eight may form complex anions of the variety $[(Chel)_4 M]^-$. Similarly, divalent ions with coordination number six may form complexes of the type $[(Chel)_3 M]^-$, etc. Other complex structures may be visualized, based upon those described above.

As stated hereinbefore, the tropolone-containing polymers of this invention are conveniently prepared by reacting at an elevated temperature aqueous mixtures containing tropolone and aldehydes in the presence of a catalyst. A particularly useful embodiment of this invention resides in the catalyzed condensation of tropolone and formaldehyde, together with other condensing species, making available tropolone-containing copolymers with a wide variety of properties.

Formaldehyde is the preferred aldehydic compound, although aldehydes such as acetaldehyde, butyraldehyde, chloral, acrolein, furfural, propionaldehyde, valeraldehyde, chloroacetaldehyde, benzaldehyde, p-tolualdehyde, cyclohexanecarboxaldehyde, 2 - pyridinecarboxaldehyde, are similarly useful in the formation of tropolone polymers.

Suitable comonomers are those which contain active hydrogen atoms which are capable of reacting with aldehydes to form hydroxymethylene groups and hence will copolymerize with the tropolone in the condensation process. Examples are phenols having free positions on the benzene nucleus ortho or para to the phenolic hydroxyl group such as cresols as p-methylphenol, xylenols as 2,3-dimethylphenol, p-tert-butyl or p-tert-amyl phenols, p-phenyl phenol, o, m, or p-chlorophenol, hydroquinone, catechol, resorcinol, and the like.

Amino-type compounds capable of forming hydroxymethylene groups also are copolymerizable. These include thiourea; aniline; benzene and toluene sulfonamides; dicyandiamide; guanidine; alkyl substituted ureas, as symdiethyl urea or methyl urea; ammeline; methylolureas, such as dimethylolurea; melamine; methyl, phenyl, and benzyl guanamines; and the like.

Catalysts useful in the process of this invention may be either acidic or basic catalysts, the type and amount of which depend primarily upon the end use intended for the product. Useful catalysts include, among others, alkali metal hydroxides, alkaline earth metal hydroxides, carbonates such as those of the alkali metals, ammonia, trimethylamine, diethylamine, hydrochloric acid, sulfuric acid, oxalic acid, trichloracetic acid, phosphoric acid, lactic acid, magnesium phenoxide, quaternary ammonium hydroxides, aromatic sulfonic acids, and the like. It is also within the scope of this invention to employ both types of catalyst in the preparation of a polymer, as for example, by starting the condensation with an alkaline catalyst, and following with an acidic catalyst. From the standpoint of cost and usefulness of the products obtained, sodium hydroxide and hydrochloric acid are most often used and therefore, are preferred catalysts.

Basic catalyst concentrations may vary over a wide range, 0.01 to 1.5 mole of base per mole of condensing species being preferred, although both higher and lower concentrations may be employed, if desired. The operation of the process utilizing acidic catalysts generally is carried out with concentrations of acid providing a reaction mixture whose pH is above 1. However, higher acid concentrations are applicable, although it is preferred that the pH of the mixture be kept above that at which the tropolone exists predominantly in the form of a "tropyllium-type" species, i.e., $(C_7H_4(OH)_2)^+$. It is preferred to employ basic-type catalysts.

Variations in the tropolone-aldehyde or the tropolone-comonomer-aldehyde ratios in the polymer formulations have a great effect on the properties of the polymer obtained. When employing formaldehyde as the aldehyde ingredient, generally the process is found to produce desirable products when the formaldehyde-tropolone ratio, or in the case of the copolymers, the formaldehyde-total comonomer ratio, is within the range of 0.8 to 6. However, wide variations from these concentrations are permissible. Similar ranges are employed with other aldehydes.

The temperatures employed in the practice of the process of this invention are generally above at least about 50° C. and preferably within the range of 50 to 150° C. While lower temperatures are permissible, it is likely that the condensation reaction will be too slow to be economically feasible. Higher temperatures provide increased reaction rates and may be utilized, if desired, but temperatures should be maintained below that at which the tropolone nucleus is rearranged to a benzoic acid species, i.e., about 300° C. under basic conditions, or below that at which the products decompose. Higher temperatures are employed in pressurized systems.

The comonomers may be added directly to the mixture, or may be introduced in the form of intermediate products obtained from the reaction of aldehyde and comonomer; the latter is exemplified in the preparation of urea-tropolone copolymers from tropolone and dimethylolurea. The relative proportions of comonomers in the copolymer products are readily modified by a change in reaction conditions. Therefore, a change in the type and/or amount of catalyst, the temperature, the ratio of aldehyde to condensing comonomer, the ratio of tropolone to comonomer, etc., each may lead to reaction products with modified compositions and properties.

The inherent viscosities of the soluble polymers obtained by the process of this invention are determined in solution in a suitable solvent, for example, dimethylformamide. The inherent viscosity ($\gamma_{inh}$) is $$\text{the log} \frac{\text{relative viscosity}}{\text{concentration}}$$

The relative viscosity is $$\frac{\text{viscosity of solution}}{\text{viscosity of the solvent}}$$

The viscosities are measured usually at 0.5% or 1.0% concentration. The inherent viscosity is a measure of molecular weight, being greater as the molecular weight is higher. The soluble polymers prepared according to the present invention have $\gamma_{inh}$=about 0.02 to about 1.0. When the polymers such as the soluble prepolymers are heated to cross-link them, the molecular weight increases sharply because of the cross-linking. Predominantly, cross-linked polymers are usually insoluble in all solvents.

The condensation polymers described in the examples are pale-yellow solids which may be cured by the conventional techniques of phenol-formaldehyde technology. Although somewhat hydrophobic, the polymers may be water-swollen. The polymers are weakly acidic and form both simple salts and chelate derivatives with metal ions. Many of the polymeric metal derivatives are highly colored.

Common chelate-forming metals are beryllium, magnesium, scandium, titanium, vanadium, chromium, iron, cobalt, nickel, copper, zinc, gallium, yttrium, zirconium, niobium, molybdenum, silver, hafnium, rare earths, thorium, actinides, tantalum, platinum, thallium, etc. Obviously, chelation takes place with substantially all positive metals of the Periodic System.

The polymeric products, including prepolymers, cured polymers, etc., alone and as simple salts are useful chelating agents effective for removing metal ions from solution. The chelating properties are retained in polymer solutions which, therefore, may be employed for solvent extraction techniques. The polymer salts, in themselves are useful products. For instance, as alkali metal salts, the polymers are useful ion exchangers, rapid to reach equilibrium. The highly colored salts are useful in pigments, as for example, in paint compositions. Many of the salts and salt solutions may be used to provide metal ions to systems in which they would normally not be tolerated, for example, for catalysts applications.

Many of the polymeric products are also useful for the preparation of molded articles, for example, by employing injection molding techniques. Articles of a wide variety of shapes are obtained. As a molding powder, the compositions may be mixed with dyes, pigments, plasticizers, fillers, and the like.

The condensation polymers for tropolone and aldehydes are also very good bonding agents. Not only can sections of the same material be joined with a strong bond but many dissimilar materials which have been difficult or impossible to join satisfactorily also can be joined by their use. A significant advantage of these materials as bonding agents is associated with their storage stability. As long as the composition is maintained at room temperature, the composition does not cure or cross-link, providing a bonding agent, having in effect, an infinite pot life.

The new tropolone-containing compositions can be used for bonding foils, wires, rods, fibers, films, fabrics, metals, alloys, synthetic resins, etc. They are also suitable bonding agents for forming composite materials such as abrasive wheels, laminates, reinforced structures and the like. Some of the materials useful in making composite laminates are aluminum, steel, copper, brass, wood, glass, polyethylene terephthalate, iron, cellophane, polyvinyl chloride, nylon, and many others. The compositions are especially suitable for the adhesive bonding of metals, giving metal-to-metal bonds that retain excellent strengths at high temperatures and for forming fibrous glass and asbestos reinforced structures.

Although all of the tropolone-aldehyde condensation polymers including the copolymer compositions have utility as bonding agents, especially suitable polymers are those formed by condensation with formaldehyde; of these, prepolymers which have softening points within the range 200° to 400° F. constitute a preferred subgroup of the general class of polymers hereinabove described.

The procedure employed in utilizing these polymers as bonding agents in adhesive applications comprises contacting said polymers with the surfaces to be joined (adherends) and heating to bring about the cure. The adhesive composition is applied in a conventional manner, for instance by spraying, brushing, rolling, blade application, etc.

In certain adhesive applications, compositions showing improvement in the properties of the adhesive bond are obtained when other components are used with the tropolone condensation polymers. The other components of the adhesive composition are, in effect, modifiers. Modifiers comprise fillers, extenders, plasticizers, additives, and the like. The fillers can be either organic, such as carbon black and apricot meal, or inorganic such as asbestos, metal powders, metallic oxides, glass, sand, clay, etc., depending particularly upon the adherends upon which the adhesive formulation is to be applied and the desired joint characteristics. By the term, filler, is meant a relatively non-adhesive substance added to an adhesive to improve its working properties, permanence, strength or other qualities. The kinds of fillers useful in these compositions are widely variable, and although a given filler may produce a good adhesive when applied to almost any material, it is obvious that various of these fillers will be superior in certain applications. It has been found, for example, that a certain adhesive composition of this invention including aluminum powder filler is superior for joining aluminum to aluminum whereas a similar adhesive composition utilizing iron powder produces a superior bond when joining steel to steel, other features being equal. Other desirable combinations will be readily apparent to those skilled in the art. Typical fillers useful in the adhesive compositions of this invention are silicon dioxide, finely divided clays such as kaolin, finely divided titanates, finely divided structural metals such as aluminum, iron, titanium, zinc, etc., finely divided, high-melting metal oxides such as titanium dioxide and aluminum oxide, and finely divided glass, carbon, "Teflon," and the like.

It is well recognized that the amount of filler employed in an adhesive composition alters or modifiers properties such as thermal coefficient of expansion, elastic modulus, shinkage, impact resistance, joint strength, etc. Therefore in formulating an adhesive for joining metal to metal, for example, especially for elevated temperature use, it is particularly important to match as closely as possible the thermal coefficient of expansion of the adhesive to that of the metal being bonded. A considerable difference in this property leads to a bond with poor temperature resistance. Therefore, the kind and amount of filler incorporated into the high temperature adhesives is chosen to provide the desired thermal characteristics in the final adhesive product. Generally, filler may be added in an amount ranging from 30 to 65% by weight of the raw composition. About 50% by weight of filler is normally preferred. For high temperature stable metal-to-metal adhesive formulations, finely divided metals and metal oxide powders appear to be the most suitable fillers.

To prepare adhesive compositions for other particular uses, the adhesive compositions may contain, in addition to or in place of inert and reinforcing fillers, various modifiers such as plasticizers, curing aids, extenders, etc., to modify their basic properties, for instance to provide resistance to impact, bending or peeling forces, or to cause further cross-linking of the polymeric ingredient to increase rigidity and hardness of the bond. If resistance to impact and to bending or peeling forces is desired, a plasticizer, such as an organic ester, e.g., dibutylphthalate, tricresyl phosphate, etc., a thermoplastic resin such as polyvinyl butyral, or an elastomeric material, such as neoprene, among others, may be added. The exact amount of each of these employed is usually dictated by the results desired. Plasticizers in an amount ranging from 5 to 15 weight percent of the composition are suitable. However, it is known that as the mount of the plasticizer or elastomeric or thermoplastic component is increased, the trend is toward lower tensile and shear strengths and increased creep under load. Hence if a large amount of plasticizer is employed, a particular formulation may no longer be suitable for structural applications and may lose some of its thermal resistance, although it may be quite suitable in non-structural, lower temperature applications.

If it is desired to increase the amount of cross-linking in the adhesive compositions, usually to give a more rigid bond, additives such as laumimum acetylacetonate (cross-linking by transchelation whereby the acetylacetone is evaporated from the aluminum acetylacetonate, and the remaining aluminum chelates in three dimensions with the tropolonealdehyde polymer), trimethylolmelamine, paraformaldehyde, ethylene glycol, etc., may be added to the adhesive composition. However, the inclusion of excessive amounts of cross-linking agents generally results in adhesive formulations having high softening temperatures. Therefore, to obtain good bond strength, high curing temperature are required, a factor which greatly decreases the versatility and practicality of adhesive compositions.

The strength of the resulting adhesive bond is related not only to the adhesive composition and to the nature of adherend employed but also to such factors as the design of the joint, the bonding technique employed, the thickness of the adhesive layer, the surface preparation and the strength and thickness of the parts being bonded.

In general, sufficient adhesive must be applied to the adherends to insure complete coverage of the faying surfaces and to provide a cured bond having a suitable glue thickness. A single coat of the adhesive compositions of the instant invention is normally adequate for any bonding problem. The adhesive composition may be applied as a fine powder, e.g., a finely-divided tropolone-formaldehyde polymer, as paste, e.g., a composition containing a tropolone-acetaldehyde polymer, aluminum filler and ethylene glycol or a fluid mixture of a tropolone-aldehyde polymer to which filler, plasticizer, additive, etc., is added; films may be cast from appropriate solvents; polymer solutions may be employed as glues; etc. The compositions are simply applied to the desired surfaces to form layers of adequate thicknesses, the other surface is superimposed and heat and pressure are applied for a given period of time until curing is accomplished.

Optimum strength properties are obtained for most of the adhesives herein described if the glue-line thickness is within the range from one-half to thirty mils. Glue-line thickness is the thickness of the adhesive itself determined by the difference in thickness between the over-all bond and the sum of the adhered thicknesses, as measured for standard lap joints. The appropriate adhesive-layer thickness employed in each instance is usually related to the particular kind and thickness of adherend. For instance, when bonding film to film wherein the film thicknesses are of the order of 2 to 3 mils, thin glue layers—e.g., 1 to 3 mils—are most often employed. With metals, on the other hand, thicker layers of the adhesive, that is of the order of 2 to 30 mils, are more suitable. In any instance, however, sufficient adhesive must be present to provide against the possibility of "starved" bonds, i.e., bonds without a uniform adhesive film between adherends.

Before applying the adhesive agent to metals, it is advisable to clean the surfaces thereof to remove grease and other impurities in a conventional manner.

Composite structures such as grinding wheels, coated abrasives, and laminated plastics are also formed by utilizing the bonding properties of the tropolone-aldehyde polymeric compositions. In the preparation of grinding wheels, for example, the abrasive grains are held together by the polymeric composition which functions then as a binder. Of course, modifiers such as fillers and reinforcements may be added to improve the properties of the grinding wheels for a particular end use, and controlled variation of abrasive, binder and pore space regulates the grinding characteristics of the wheel. In the case of coated abrasives, the abrasive grains are held together by the compositions of this invention which also function to bond the grains to the backing material, for instance, paper, fabric, vulcanized fiber, etc.

Sheets or webs of almost any type of material can also be joined together by a layer of the tropolone-aldehyde compositions between them, giving useful laminates. For instance, superimposed layers of glass fabric or fiber, felted asbestos, nylon fabric, etc., as base materials, either in the form of sheets or "mascerated" are layered with the polymeric compositions, heat and pressure are applied, and a dense, insoluble solid is obtained, in the form of a sheet or other molded form. The inclusion of modifiers in the polymeric compositions allows the production of such laminates with widely varying characteristics. Because of the nature of the polymeric compositions of this invention and their ability to function as bonding agents for such a wide variety of materials, combination laminates having a combination of physical, mechanical and electrical properties, unavailable in a single material, may also be produced.

The temperature used in the curing of the tropolone-aldehyde containing bonding agents is preferably slightly above the softening point of the composition—usually within the range 200 to 400° F. At these temperaures curing is effected in about 2–4 hours. The bodies to be bonded are, of course, held under continuous contact pressure during curing.

Within the scope of this invention, a broad range of polymeric bonding compositions containing as the essential ingredient a tropolone-aldehyde condensation product is herein described.

In all the examples, all percentages are on a percentage weight basis and all parts are parts by weight.

*Example I*

A mixture containing 12.2 grams of tropolone, 10 grams of 37% formaldehyde, 66 ml. of water and 4 grams of sodium hydroxide is mixed, refluxed for 24 hours, cooled and allowed to stand at room temperature overnight. Then the pH is adjusted to 5 with acetic acid. The water is decanted and the polymer residue is dissolved in dimethylformamide. The polymer is reprecipitated by treating the dimethylformamide solution with a saturated solution of sodium chloride. Drying under vacuum at 60° C. overnight yields 11 grams of a yellowish polymer. This resin, designated Resin I, has an inherent viscosity of 0.04 in a concentration of 1 gram per 100 cc. of dimethylformamide at 25° C. Correlating this resin with the numbers obtained for a similar polymer prepared from salicyclic acid and formaldehyde indicates a molecular weight in the range of 4000–7000.

Example I–A

The procedure of Example I is followed except that after the polymer is reprecipitated by treating the dimethylformamide solution with a saturated solution of sodium chloride the product is filtered, extracted for 24 hours with boiling water in a Soxhlet extractor, ground, and dried under vacuum at room temperature. Substantially, the same product is obtained.

Example II

A mixture containing 0.61 gram of tropolone, 1 gram of 37% formaldehyde, 2 grams of 20% aqueous sodium hydroxide and 0.47 gram of phenol is heated to reflux for two hours. The mixture is cooled and the pH brought to 5 with hydrochloric acid. A brown, waxy semi-solid is obtained which is then dissolved in chloroform. After the solution is dried, the solvent is removed leaving a yellow solid product which is soluble in acetone, chloroform and dioxane. This resin is designated Resin II.

Example III

A mixture containing 1.28 grams of tropolone, 1 gram of 37% formaldehyde solution and 5 ml. of water is heated with stirring until a clear solution forms. A solution containing 2 grams of 20% sodium hydroxide in 5 ml. of water is added and the mixture is refluxed for two hours. A yellow solution is obtained to which 0.01 gram of resorcinol is added. The mixture is then refluxed another hour. After cooling and adjusting the pH to 6 with acetic acid, the mixture is heated to boiling and 1.47 grams of a light yellow polymer separates out. A sample of this product darkens but does not melt at temperatures up to 300° C. The polymer is cured overnight at 120° C. and 50 mm. pressure. The cured product turns green in the presence of ferric ions and blue in the presence of cupric ions. This resin is designated as Resin III.

Example IV

A mixture containing 1.28 grams of tropolone, 1 gram of 37% formaldehyde, 5 ml. of water and 2 grams of a 20% aqueous sodium hydroxide solution is refluxed for thirty minutes. The mixture is cooled and the pH brought to 5 with acetic acid. The solid polymeric product which separates out is dissolved in acetone and reprecipitated by the addition of n-hexane. The polymer is soluble in acetone and dimethylformamide. This resin is designated Resin IV.

Example V

A mixture containing 1.28 grams of tropolone, 1.26 grams of melamine, 4 grams of 37% formaldehyde, 0.4 gram of sodium hydroxide and 13.2 ml. of water is heated at reflux for 2 hours. After standing 48 hours at room temperature (about 25° C.), the pH is brought to 5 with acetic acid and the solid product is collected and washed. The yellowish product (3.35 grams) is insoluble in dimethylformamide and does not melt, but decomposes at a temperature of about 200° C.

Example VI

The procedure of Example V is applied to a mixture containing 1.28 grams of tropolone, 3 grams of 37% formaldehyde, 0.4 gram of sodium hydroxide, and 6.6 ml. of water. The solid product (4.52 grams) is dissolved in dimethylformamide and reprecipitated by the addition of a brine solution. The yellowish product does not melt but decomposes at a temperature of about 200° C.

Example VII

The procedure of Example V is applied to a mixture containing 1.28 grams of tropolone, 1 gram of 37% formaldehyde, 0.2 gram sodium hydroxide, and 6.6 ml. of water. The product (1.41 grams) is treated with dimethylformamide, leaving 0.26 gram of a dimethylformamide insoluble residue. The soluble fraction is reprecipitated from the dimethylformamide solution by the addition of brine. The reprecipitated product does not melt but decomposes at a temperature of about 200° C.

The formation of the various metal derivatives of the resins occurs readily. Aqueous solutions of metal ions are prepared from metal salts, preferably containing anions with little tendency to form coordinate bonds, and the pH of the solution is adjusted to that required to prevent hydrolysis of the metal ion. In the case of transition metals, this is usually within the range, pH 1.5–4.5. The chelating polymer needs only to be contacted with the metal salt solution for the metal derivatives to form. The examples which follow illustrate in more detail their formation. These metal derivatives are predominantly chelate in nature.

Example VIII

Samples (0.1 gram) of Resin III are equilibrated for 18 hours with 25 ml. portions of a 0.1 M solution of various metal salts, adjusted to an appropriate pH with acetic acid and/or sodium acetate. The somewhat hydrophobic resin is not pre-swollen prior to equilibration. The results are given in Table I.

TABLE I

| Salt Solution (0.1 M) | Solution pH | Weight Percent Metal in Resin |
| --- | --- | --- |
| $FeCl_3$ | 2–2.5 | 0.11 |
| $UO_2(Ac)_2 \cdot H_2O$ | 4 | 0.17 |
| $Mg(NO_3)_2$ | 4 | 0.03 |
| $Mn(NO_3)_2$ | 4 | 0.05 |
| $AlCl_3$ | 3–3.5 | 0.04 |

Example IX

Samples (0.1 gram) of Resin I are pre-swollen employing the following technique. The resin samples are dissolved in a minimum quantity of dimethylformamide. The polymer is reprecipitated from the solution by treatment with a saturated sodium chloride solution. The liquid is decanted off and the swollen polymer samples are equilibrated for 18 hours with 25 ml. portions of various 0.1 M salt solutions, buffered to an appropriate pH with acetic acid and sodium acetate. The results are summarized in Table II.

TABLE II

| Metal Salt (0.1 M) | Solution pH | Weight Percent Metal in Resin |
| --- | --- | --- |
| $Cr(NO_3)_3$ | 4 | 0.70 |
| $Th(NO_3)_4$ | 3 | 3.33 |
| $LaCl_3$ | 4 | 0.73 |
| $Ce(NO_3)_3$ | 4 | 2.00 |
| $Co(NO_3)_2$ | 4 | 1.58 |
| $NiCl_2$ | 4 | 0.59 |
| $CuSO_4$ | 4 | 4.34 |
| $FeCl_3$ | 2 | 1.07 |
| $FeSO_4$ | 4 | 10.00 |
| $Mn(NO_3)_2$ | 4 | 1.20 |
| $Al_2(SO_4)_3$ | 4 | 1.16 |
| $SnCl_2$ (1 M) | 1.2 | 25.80 |
| $SnCl_4$ (1 M) | 1.2 | 35.10 |

Metal derivatives which contain higher quantities of metal are formed when the polymers are precipitated from solution in the presence of metal ion.

Example X

A 0.4 gram sample of the resin of Example I is dissolved in dimethylformamide, and a 0.1 M solution of a metal salt is added. The polymer chelate usually precipitates from solution. If precipitation does not occur the chelate is removed from solution by the addition of sodium chloride. The precipitated product is removed by filtration, washed thoroughly with water and dried at 40–50° C. for 24 hours. The results are summarized in Table III.

TABLE III

| Metal Salt (0.1 M) | Solution pH | Weight Percent Metal in Resin |
|---|---|---|
| $(NH_4)_2Ce(NO_3)_6$ | 1–2 | 8.34 |
| $Cu(NO_3)_2$ | 3–4 | 15.80 |
| $Al_2(SO_4)_3$ | 2–3 | 7.80 |
| $FeCl_3$ | 2 | 12.60 |
| $FeSO_4$ | 4 | 7.90 |
| $SnCl_2$ | 1–2 | 29.50 |
| $SnCl_4$ | 1–2 | 27.40 |

The weight percent of metal in the resins of Examples VIII and IX is determined as follows: Following the equilibration of the resin sample with the metal ion, the chelated resin is removed by filtration and washed thoroughly with water. The sample is dried in a vacuum oven and then ignited at 1000° C. to constant weight. The metal oxide residue is weighed, and the metal uptake per unit weight of the resin is computed in terms of weight percent.

Example XI

The procedure of Example V is applied to a mixture containing 1.28 grams of tropolone, 1.26 grams of melamine, 2 grams of 37% formaldehyde, 0.4 gram of sodium hydroxide and 6.6 ml. of water. The solid product (3.99 grams) is not soluble in dimethylformamide and does not melt, but darkens when heated to about 200° C. The polymer forms strong chelates with ferric ions.

Example XII

A mixture, containing 1.28 grams of tropolone, 1.2 grams of dimethylolurea (prepared by reacting 6 parts of urea with 17 parts of 37% formaldehyde for 15 hours at 18–25° C. at a pH of 7–8), 20 ml. of water and 2 drops of 0.2 normal hydrochloric acid, is heated to reflux for 16 hours. After cooling, the pH is brought to 5 with acetic acid, and the product is filtered and washed with with water. The resin is then soaked 12 hours in water followed by soaking 8 hours in ethanol. The product forms stable chelates with iron and copper ions. Elemental analyses and examination of the infrared spectrum of the product indicates a urea-formaldehyde-tropolone copolymer is formed. The product contains about 3 tropolone units per urea unit.

Example XIII

Following the procedure of Example XII, except that the HCl catalyst is replaced by 400 mg. of sodium hydroxide, a polymeric product, insoluble in water and alcohol, is produced. Analyses indicate the product is a tropolone-urea-formaldehyde copolymer containing about 10 tropolone units per urea unit. Stable chelates form when the polymer is contacted with a solution containing iron or copper ions.

Example XIV

Following the procedure of Example XII, except that 100 mg. of oxalic acid is used as the catalyst and that the reaction time is increased to 48 hours, a product identified as a urea-tropolone-formaldehyde copolymer is produced. Analyses indicate the polymer contains about two tropolone units per urea unit. The polymer product forms stable chelates with copper and iron ions.

Example XV

By applying the procedure of Example III to a mixture containing 12.8 grams of tropolone, 10 grams of 37% formaldehyde, 4.0 grams of sodium hydroxide, 50 ml. of water and 0.01 gram of resorcinol, a polymer yield of 15.5 grams is obtained. The product does not soften when heated up to 300° C., after curing for 16 hours at 120° C.

Example XVI

A mixture containing 2.3 grams of tropolone, 12.2 grams of tert-butyl phenol, 13 grams of 37% formaldehyde, and 0.1 gram of sodium hydroxide is refluxed for 1.5 hours. The mixture is allowed to cool and the pH is adjusted to 5 with acetic acid. The water is decanted and the polymer residue is dissolved in dimethylformamide. The polymer is reprecipitated by treating the dimethylformamide solution with sodium chloride and washed. After drying under vacuum at 60° C. overnight, 15 grams of a yellowish product which softens at 107° C. is obtained.

Example XVII

Employing the procedure of Example I except that refluxing is continued for 24–48 hours, results in the formation of a dimethylformamide-soluble polymer having an inherent viscosity of 0.07.

Example XVIII

A mixture containing 12.8 grams of tropolone, 10 grams of 37% formaldehyde, 66 ml. of water and 4 grams of sodium hydroxide is refluxed for 3 days. After the mixture cools to room temperature, the pH is adjusted to 5 with acetic acid. The water is decanted off, and the polymer residue is washed thoroughly with water. Drying is carried out under vacuum at 60° C. overnight. A yellow, highly cross-linked polymer, insoluble in all organic solvents, is obtained. A small amount of dimethylformamide-soluble material which decomposes at 215° C. is also recovered. The insoluble material does not melt up to 300° C.

Example XIX

A mixture containing 1.22 grams of tropolone, 0.7 gram of 37% formaldehyde, 5 ml. of water and 0.4 gram of sodium hydroxide is heated at reflux for 7 hours. After standing at room temperature overnight, the pH is adjusted to 5 with acetic acid, and the solid product is collected, washed and dried in air. The tan solid softens with darkening but does not melt up to 125° C.

Example XX

The procedure of Example XIX is applied to a mixture containing 1.22 grams of tropolone, 5 grams of 37% formaldehyde, 5 ml. of water and 0.4 gram of sodium hydroxide. The product (0.71 gram) is a brown solid which darkens at 230° C. but does not melt up to 300° C.

Example XXI

A mixture containing 1.22 grams of tropolone, 25 ml. of water and 0.4 gram of sodium hydroxide is heated to reflux, and 1 gram of furfural is added. After refluxing for 4 hours, a second gram of furfural is added to the mixture and refluxing is continued an additional 47 hours. The excess liquid is then distilled off, leaving a black solid residue. The residue is acidified with acetic acid and dried under vacuum (27 mm. of Hg) at 100° C. for 4 hours. The dried product is extracted with hot water and the insoluble material is dried at 28 mm. of Hg pressure and 100° C. for 2½ hours, yielding 0.64 gram of dried polymer. The inherent viscosity of this product, measured in dimethylformamide at a concentration of 1 gram of polymer per 100 cc. of dimethylformamide at 25° C., is 0.06.

Example XXII

A mixture containing 1.22 grams of tropolone, 0.4 gram of sodium hydroxide and 5 ml. of water is heated to reflux and 2 grams of furfural is added. The refluxing is continued for 6 days. The excess liquid is distilled off, leaving a dark residue which is acidified with acetic acid and dried under vacuum (28 mm. of Hg) at 100° C. for 2½ hours. The dried product is extracted with 400 ml. of hot water, and the water-insoluble fraction is dried as above. The inherent viscosity, as determined at 25° C. for a solution containing 0.1 gram of this product and 100 cc. of dimethylformamide, is 0.4. The dimethylformamide-insoluble material did not melt at temperatures up to 300° C.

Example XXIII

The following ingredients are mixed in amounts as follows:

Tropolone-formaldehyde resin (50 parts) (condensation product prepared from 12.2 parts of tropolone, 10 parts of 37% formaldehyde, 66 parts of water and 4 parts of sodium hydroxide; softening point 130–188° C.; inherent viscosity 0.04 in a concentration of 1 g./100 cc. of dimethylformamide at 25° C.) and 50 parts of aluminum dust are mixed on a vibrating mixer. The dry mixture is applied between two 4 x 6-inch sheets of 20–24–T3 Alclad aluminum of 0.064 inch thickness to form a single one-half inch lap joint. The assembly is then placed in a press at 2000 p.s.i. and cured for 2 hours at 350° F. The tensile sheer strength in pounds per square inch of the bond is determined under various conditions. The results are tabulated below:

| Test Conditions | Glue Line Thickness, Mil (Av.) | Tensile Shear Strength, p.s.i. | |
| --- | --- | --- | --- |
| | | Av. | Max. |
| At room temperature | 7.9 | 1,577 | 1,720 |
| At room temperature after annealing at 350°F. for 1 hr | 3.4 | 1,902 | 2,147 |
| At 350° F. after soaking at 350° F. for 30 min | 6.6 | 2,033 | 2,260 |
| At 500° F. after soaking at 500° F. for 30 min | 3.5 | 1,533 | 1,650 |
| At 500° F. after aging for 100 hours at 500° F. | [1] 4.0 | | 1,044 |

[1] Glue line thickness for plate showing max. tensile shear.

Example XXIV

The procedure of Example XXIII is repeated except that 50 parts of iron powder replaces the aluminum powder and that the adhesive mixture is applied between two 4 x 6-inch sheets of 301 stainless steel, ¼ hard, No. 2 dull finish of .050 inch thickness. The results are tabulated below:

| Test Conditions | Tensile Shear Strength, p.s.i. | Glue Line Thickness, Mil |
| --- | --- | --- |
| At room temperature | 1,688 | 3.0 |
| At 200° F. after soaking at 200° F. for 30 min | 1,392 | 1.8 |
| At 350° F. after soaking at 350° F. for 30 min | 1,450 | 2.7 |
| At 500° F. after soaking at 500° F. for 30 min | 1,436 | 2.7 |

Example XXV

A composition similar to that of Example XXIII is prepared except that zinc dust is substituted for aluminum powder. The results in this case are substantially comparable to the case wherein aluminum powder filler is used. The average tensile shear strength, measured at room temperature is 1443 p.s.i. with a maximum of 1540 p.s.i. The average glue line thickness is 3.3 mil.

Example XXVI

A composition similar to that of Example XXIII is prepared except that the amount of aluminum powder is changed from 50 to 40 and from 50 to 60. In each case bonds having excellent tensile shear strength are obtained.

Example XXVII

The following ingredients are mixed:
- 3 parts of tropolone-formaldehyde resin (as described in Example XXIII);
- 3 parts of powdered aluminum, and
- 1 part of ethylene glycol.

The paste is applied between two 4 x 6-inch sheets of 20–24–T3 Alclad aluminum, 0.064 inch thickness, to form a single one-half inch lap joint. The assembly is heated for 2 hours at 350° F. in a press at 2000 p.s.i. The pressure is relieved and the assembly is annealed for 2 hours at 350° F. The results are tabulated below:

| Test Conditions | Glue Line (mils) | | Tensile Shear Strength (p.s.i.) | |
| --- | --- | --- | --- | --- |
| | Av. | Max.[1] | Av. | Max. |
| At room temperature | 3.3 | 2.3 | 1,323 | 1,357 |
| At 500° F. after soaking at 500° F. for 30 min | 3.3 | 3.6 | 1,546 | 1,802 |

[1] Glue line thickness for plate showing max. tensile shear.

Example XXVIII

The procedure of Example XXVII is followed except that the 3 parts of aluminum powder is replaced by 3 parts of iron powder and the composition is applied between two 4 x 6-inch plates of 301 stainless steel, ¼ hard, No. 2 dull finish, of .050 inch thickness.

| Test Conditions | Glue Line (mils) | | Tensile Shear Strength (p.s.i.) | |
| --- | --- | --- | --- | --- |
| | Av. | Max.[1] | Av. | Max. |
| At room temperature | 3.5 | 7 | 1,366 | 1,500 |
| At 500° F. after soaking at 500° F. for 30 min | 2.5 | 2.6 | 1,272 | 1,409 |

[1] Glue line thickness for plate showing max. tensile shear.

Example XXIX

The procedure of Example XXVII is followed except that the composition contains 40 parts of the tropolone-formaldehyde resin, 40 parts of aluminum powder and 4 parts of polyvinyl alcohol (type A). The average tensile shear strength of the bond at room temperature is 2105 p.s.i., the average glue line 5.9 mil. The maximum tensile shear strength obtained was 2157 p.s.i., the sample having a glue line of 5.6 mil.

Example XXX

The procedure of Example XXVII is followed except that the composition contains 40 parts of tropolone-formaldehyde resin, 40 parts of aluminum powder and 5 parts of n-butyl phthalate. The average tensile shear strength of the bond, at room temperature, is 2206 p.s.i., with average glue line of 3.4 mil. The maximum observed is 2328 p.s.i., the sample having a glue line of 3.8 mil.

Example XXXI

Fifty parts of a tropolone-formaldehyde polymer as described in Example XXIII is mixed on a vibrating mixer with 50 parts of each of the following fillers: asbestos powder, aluminum oxide and aluminum phosphate. The compositions are applied between sheets of 20–24–T3 Alclad aluminum, 0.056 inch thickness, and the assembly is heated for 2 hours at 350° F. in a press at 2000 p.s.i. Each of the bonds has good tensile shear strength.

The maximum observed for asbestos filler is 1356 p.s.i., with a glue line of 11.6 mils; for aluminum oxide 1435 p.s.i. with a glue line of 10.5 mils; for aluminum phosphate 1370 p.s.i. with a glue line of 6.9 mils.

*Example XXXII*

A paste is prepared from 20 parts of tropolone-formaldehyde polymer as described in Example XXIII and 7 parts of ethylene glycol and is applied between two 4 x 6-inch plates of stainless steel (301) of .050 inch thickness with a standard half-inch lap joint. The assembly is heated to 350° F. under 1000 p.s.i. pressure for 1 hour.

The bond has an average tensile shear strength of 1610 p.s.i. at room temperature with an average glue line of 1 mil. The maximum tensile shear strength observed is 1830 p.s.i. with a glue line of 1.3 mil.

*Example XXXIII*

A mixture containing 5 parts of tropolone-formaldehyde polymer as described in Example XXIII and 1 part of paraformaldehyde is used to bond 20–24–T3 Alclad aluminum sheets. The bond has good tensile shear strength.

*Example XXXIV*

The procedure of Example XXXII is followed except that one part of the composition of Example XXXII is mixed with 1 part of iron powder. The bond has an average tensile shear strength of 1777 p.s.i. at room temperature with an average glue line of 1.6 mil. The maximum tensile shear, 1910 p.s.i., was observed with a glue line of 1.1 mil.

*Example XXXV*

A composition containing 3 parts of a tropolone-acetaldehyde polymer (prepared by mixing 1.06 parts of tropolone, 0.5 part of acetaldehyde, 0.4 part of sodium hydroxide and 20 parts of water and refluxing for 24 hours. The solution is cooled and then made acid with acetic acid. The resultant solid is separated, extracted with water and dried. The product is a brown powder, soluble in N,N-dimethylformamide, benzene and chloroform but insoluble in methanol and water. It has a softening point of 130° C. Analysis: Found: percent C, 73.21; percent H, 8.02) and 3 parts of aluminum powder is applied between two strips of Alclad 20–24–T3, 0.056 inch thickness, and the assembly is heated at 350° F. for 2 hours under 2000 p.s.i. pressure. The tensile shear strength of the bond indicates good adhesion.

*Example XXXVI*

The procedure of Example XXXV is followed except that 3 parts of a tropolone-dimethylolurea polymer (prepared by mixing 1.28 parts tropolone, 1.2 parts of dimethylolurea, 20 parts of water and 0.1 part of oxalic acid and heating at reflux for 48 hours. After cooling, the pH is brought to 5 with acetic acid, and the solid product is filtered and washed with water. The resinous material is then soaked 12 hours in water, followed by 8 hours in ethanol. Analyses indicate that the urea-tropolone-formaldehyde copolymer obtained contains about 2 tropolone units per urea unit) replaces the tropolone-acetaldehyde polymer. Substantially comparable results are obtained.

*Example XXXVII*

A glue-like composition is prepared from a tropolone-formaldehyde resin (as described in Example I) and dimethylformamide. The composition contains 40% by weight polymer. The glue is applied to each side of a one-inch lap on two, 5-ply, one-half inch thick samples of plywood, and 0.6 gram of dry polymer/in.² of bond is applied to each glue-coated area while the surface is still tacky. The lap is assembled, placed in a press at 1000–3000 p.s.i. and cured for 1 hour at 180° F. A very strong bond is formed. The glue bond is of greater strength than the bond between the plys of the plywood.

*Example XXXVIII*

The glue-like, 40% solution of tropolone-formaldehyde resin in dimethylformamide is coated on each side of two 1" x 4" strips of 3 mil thickness H-film. H-film is a pyromellitimide polymer prepared from pyromellitic acid and diaminodiphenyl ether as described in copending application Serial No. 169,120. The glue coat has a thickness of about 1 mil. A one-inch lap is assembled, placed in a press at 1000–3000 p.s.i. and cured for one hour at 180° F.

*Example XXXIX*

The procedure of Example XXXVIII is followed except that the glue is applied to a 1" x 4" strip of polyethylene terephthalate (3 mil) and to a 1" x 4" sample of 5-ply, ½" thick plywood as adherends. The glue coat has a thickness of about 1 mil. A strong bond is formed between the wood and polyethylene terephthalate.

*Example XL*

The procedure of Example XXXVIII is followed except that the glue is applied to a 1" x 4" strip of polyethylene terephthalate (3 mil thickness) and to a 1" x 4" strip of 0.064" thick brass. A strong bond is formed between the polyethylene terephthalate and the brass.

*Example XLI*

The procedure of Example XXXVII is followed except that the glue is applied to a 1" x 4" strip of H-film (3 mil thickness) and to a 1" x 4" strip of 0.064" thick aluminum. A strong bond is formed between the H-film and aluminum. The film ruptures before the glue bond.

*Example XLII*

The procedure of Example XXXVIII is followed except that a 1" x 4" strip of one-half inch 5-ply plywood and a 1" x 4" strip of 0.064" thick brass are employed as adherends. A strong bond formed between the brass and wood. The bond between the plys of plywood ruptures before the brass-plywood bond.

*Example XLIII*

*Preparation of a grinding wheel.*—Ten grams of tropolone-formaldehyde polymer is thoroughly mixed with 10 grams of Linde fine abrasive No. 5175 and pressed in a Teflon die of 2.5" diameter to 10,000 p.s.i. and heated 4 hours at 180–200° C. The pressure drops to 2000 p.s.i. by the end of the four hours. After release of the pressure from the die and cooling, a very hard, stone-like substance is obtained which can be used to abrade metal. A similar experiment is carried out using 5 grams of tropolone-formaldehyde polymer and 15 grams of the same abrasive. The grinding wheel which is obtained is not as strong as that obtained using the larger amount of polymer.

*Example XLIV*

*Molding with tropolone-formaldehyde polymer.*—Five grams of tropolone-formaldehyde polymer is placed in a Teflon die of 2.5" diameter. Three thousand lbs. pressure is applied to the die on a Carver press while the temperature is held at 180–200° C. for four hours. Removal of the molding from the die yields a hard wheel.

*Example XLV*

*Preparation of fiber glass laminates with tropolone-formaldehyde polymer.*—4.4 grams of a woven fiber glass mat which is composed of two circles of approximately 2.5" diameter were prepared. One mat is placed in the bottom of the previously described Teflon die and 2.2 grams of tropolone-formaldehyde polymer is distributed evenly over the surface of the mat. The second mat is superimposed and on top of this is placed another 2.2 grams of polymer. The die is then placed in a press at 180° C. and 5000 p.s.i. pressure is applied. After 2 hours at 180–200° C. the pressure has dropped to around 2000 p.s.i. The pressure is released and the die is removed and cooled. The two-ply laminate is very tough, non-brittle and strong and contains no visible cracks, voids or bubbles.

*Example XLVI*

A woven glass mat .065 inch thick and 7 x 7 inches in size is placed on top of a layer of 11 g. of tropolone-formaldehyde polymer prepared as in Example I which is evenly distributed in a mold. A layer of polymer amounting 9 grams is placed on top of the glass mat. Other layers of glass and 9 grams of polymer are added until six layers of glass are present. A layer of 11 grams of polymer is placed on top of the last layer of glass, and the top of the mold is set into place. The mold is placed in a press under 5000 p.s.i. pressure at 180–200° C. for 3 hours.

The properties of the laminate thus formed are as follows:

*Impact strength.*—13.7 ft. lbs. across notch/inch width measured according to ASTM procedure D–256–54T.

*Shore D hardness.*—88 measured on a Shore D hardness tester manufactured by the Shore Instrument Manufacturing Co., Jamaica, N.Y.

*Tensile strength.*—21,680 p.s.i.;
*Tensile modulus.*—$1.64 \times 10^6$;
*Elongation.*—1.6%;

all three measured according to ASTM procedure D–638–52T.

*Flexural strength.*—34,580 p.s.i.;
*Flexural modulus.*—$85 \times 10^6$;

both measured by the ASTM procedure D–790–49T.

*Example XLVII*

A 7″ x 7″ laminate is prepared as described in Example XLVI using 181 glass cloth with a 1100 A finish (described in military specification MIL–R–9300A) instead of a woven glass mat. The following properties are obtained:

*Shore D hardness.*—90;
*Impact strength.*—12.1;
*Flexural strength.*—48,230;
*Flexural modulus.*—$1.99 \times 10^6$.

Many additional modifications will be apparent to those skilled in the art without departing from the inventive concept.

What is claimed is:

1. A polymeric composition having an inherent viscosity of about 0.02 to about 1.0 and comprising recurring structural units of the formula

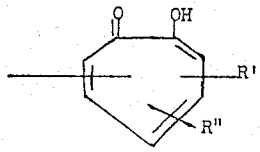

wherein the bonding sites are located at the unsubstituted positions on the tropolone ring; R' is a divalent radical selected independently from the group consisting of
—CH(Y)—O—CH(Y)—X—CH(Y)—OCH(Y)—
—CH(Y)—X—CH(Y)—
—CH(Y)—X—CH(Y)—O—CH(Y)—
—CH(Y)—O—CH(Y)X— and —CH(Y)X—
where Y is selected from the group consisting of hydrogen, an alkyl group having from 1 to about 12 carbon atoms, an alkenyl group having from 1 to about 12 carbon atoms, a cycloalkyl group having from 3 to about 7 carbon atoms, and a cycloalkenyl group having from 3 to about 7 carbon atoms, and X represents a radical of a comonomer, said comonomer selected from the group consisting of phenols and amino compounds containing at least two chemically reactive groups which add to aldehyde to form hydroxymethylene groups, said radical being at least divalent and formed from the comonomer by removal of a hydrogen from each of at least two of the chemically reactive groups; and R″ is selected from the group consisting of H, R′, —CH(Y)—, —CH(Y)—O—CH(Y)— and —CH(Y)OH.

2. A composition of matter comprising a metal derivative of the polymeric composition of claim 1.

3. The composition of claim 2 wherein the metal derivative is a simple salt.

4. The composition of claim 2 wherein the metal derivative is a chelate.

5. The composition of claim 3 wherein the metal comprises an alkali metal.

6. The composition of claim 4 wherein the metal comprises iron.

7. The composition of claim 4 wherein the metal comprises copper.

8. The composition of claim 4 wherein the metal comprises tin.

9. The composition of claim 4 wherein the metal comprises cerium.

10. A process for preparing condensation copolymers comprising heating to a temperature of 50 to 150° C. an aqueous mixture containing tropolone, an aldehydic compound, a condensable comonomer selected from the group consisting of phenols and amino compounds containing at least two chemically reactive groups which add to formaldehyde to form hydroxymethylene groups, and a catalyst, the molar ratio of tropolone to total comonomer being within the range of 0.8 to 6, and the catalyst being selected from the group consisting of (a) 0.01 to 1.5 moles of basic catalyst per mole of total tropolone, aldehydic compound and condensable comonomer and (b) an amount of acid catalyst sufficient to provide said mixture with an acidic pH above 1.

11. The process of claim 10 wherein said comonomer is a phenol.

12. The process of claim 10 wherein the aldehydic compound is formaldehyde.

13. A heat-curable adhesive composition containing as the essential bonding agent a polymer having an inherent viscosity of about 0.02 to about 1.0 and recurring structural units of the formula

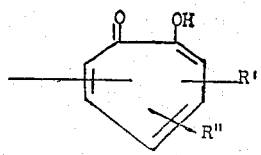

wherein the bonding sites are located at the unsubstituted positions on the tropolone ring; R' is a divalent radical selected independently from the group consisting of
—CH(Y)—, —CH(Y)—O—CH(Y)—
—CH(Y)—O—CH(Y)—X—CH(Y)—OCH(Y)—
—CH(Y)—X—CH(Y)—
—CH(Y)—X—CH(Y)—O—CH(Y)—
—CH(Y)—O—CH(Y)X— and —CH(Y)X—
where Y is selected from the group consisting of hydrogen, an alkyl group having from 1 to about 12 carbon atoms, an alkenyl group having from 1 to about 12 carbon atoms, a cycloalkyl group having from 3 to about 7 carbon atoms, and a cycloalkenyl group having from 3 to about 7 carbon atoms, and X represents a radical of a comonomer, said comonomer containing at least two chemically reactive groups which add to aldehyde to form hydroxymethylene groups, said radical being at least divalent and formed from the comonomer by removal of a hydrogen from each of at least two of the chemically reactive groups; and R″ is selected from the group consisting of H, R′ and —CH(Y)OH.

14. A composition of claim 13 comprising from 30 to 65% by weight of filler selected from the group consisting of silica, titanates, powdered metals, metal oxides, carbon and asbestos.

15. An adhesive composition of claim 13 wherein the bonding agent is a tropolone-formaldehyde polymer.

16. A composite article comprising an intimate mixture of a powdered abrasive and a cured adhesive composition of claim 13.

17. The article of claim 16 in the form of an abrasive wheel.

18. The article of claim 16 wherein the bonding agent is a tropolone-formaldehyde polymer.

19. The adhesive composition of claim 13 containing a plasticizer.

20. The adhesive composition of claim 19 wherein the plasticizer comprises from 5 to 15% by weight of the adhesive composition and is selected from the group consisting of dibutyl phthalate, tricresyl phosphate, polyvinyl butyral, polyvinyl alcohol, and neoprene.

21. A composite article comprising two layers of solid material bonded together with a cross-linked polymer comprising recurring structural units of the formula

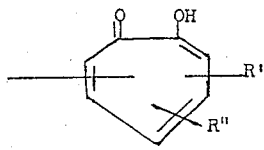

wherein the bonding sites are located at the unsubstituted positions on the tropolone ring; R′ is a divalent radical selected independently from the group consisting of
—CH(Y)—, —CH(Y)—O—CH(Y)—
—CH(Y)—O—CH(Y)—X—CH(Y)—OCH(Y)—
—CH(Y)—X—CH(Y)—
—CH(Y)—, —CH(Y)—O—CH(Y)—
—CH(Y)—O—CH(Y)X— and —CH(Y)X—
where Y is selected from the group consisting of hydrogen, an alkyl group having from 1 to about 12 carbon atoms, an alkenyl group having from 1 to about 12 carbon atoms, a cycloalkyl group having from 3 to about 7 carbon atoms, and a cycloalkenyl group having from 3 to about 7 carbon atoms, and X represents a radical of a comonomer, said comonomer containing at least two chemically reactive groups which add to aldehyde to form hydroxymethylene groups, said radical being at least divalent and formed from the comonomer by removal of a hydrogen from each of at least two of the chemically reactive groups; and R″ is selected from the group consisting of H, R′ and —CH(Y)OH.

22. The composite article of claim 21 wherein said solid materials are selected from the group consisting of aluminum, steel, stainless steel, titanium, polyethylene terephthalate, glass, brass, wood and pyromellitimides.

23. The article of claim 21 wherein one layer of solid material is polyethylene terephthalate and the other is wood.

24. The article of claim 21 wrerein one layer of solid material is polyethylene terephthalate and the other is brass.

25. The article of claim 21 wherein one layer of solid material is polyethylene terephthalate and the other is aluminum.

26. The article of claim 21 wherein one layer of solid material is aluminum and the other is a pyromellitimide.

27. A sheet of abrasive paper comprising a sheet of paper coated on at least one side with a powdered abrasive embedded in a matrix consisting essentially of a tropolone-aldehyde cross-linked polymer.

References Cited by the Examiner

UNITED STATES PATENTS

| 2,387,256 | 10/1945 | Groten | 260—57 |
| 2,631,098 | 3/1953 | Redfern | 260—57 |

OTHER REFERENCES

Carswell: Phenoplasts, pp. 9–20, p. 21 relied on, Interscience Publishers, New York (1947).

Gowan et al.: Name Index of Organic Reactions, pp. 9, 10 and 153, Longmans (London) 1960.

Nozol et al.: Chem. Abs., vol, 46, pp. 7561e–7562d (1952).

Nozol et al.: Chem. Abs., vol. 48, pp. 3946d–3948 (1954).

WILLIAM H. SHORT, *Primary Examiner.*

J. C. BARTIN, *Assistant Examiner.*

UNITED STATES PATENT OFFICE
CERTIFICATE OF CORRECTION

Patent No. 3,295,939                                January 3, 1967

Lorraine Guy Donaruma

It is certified that error appears in the above identified patent and that said Letters Patent are hereby corrected as shown below:

Column 17, lines 71 and 72, cancel ", said comonomer" and insert the same after "compounds" in line 73, same column 17. Column 19, line 33, "-CH(Y)-,-CH(Y)-O-CH(Y)-" should read -- -CH(Y)-X-CH(Y)-O-CH(Y)- --. Column 20, line 13, "wrerein" should read -- wherein --.

Signed and sealed this 3rd day of February 1970.

(SEAL)
Attest:

Edward M. Fletcher, Jr.                         WILLIAM E. SCHUYLER, JR.
Attesting Officer                                     Commissioner of Patents